Oct. 4, 1955 H. B. REID 2,719,307
FOOTREST FOR ANIMAL HYDROTHERAPY
Filed July 14, 1953
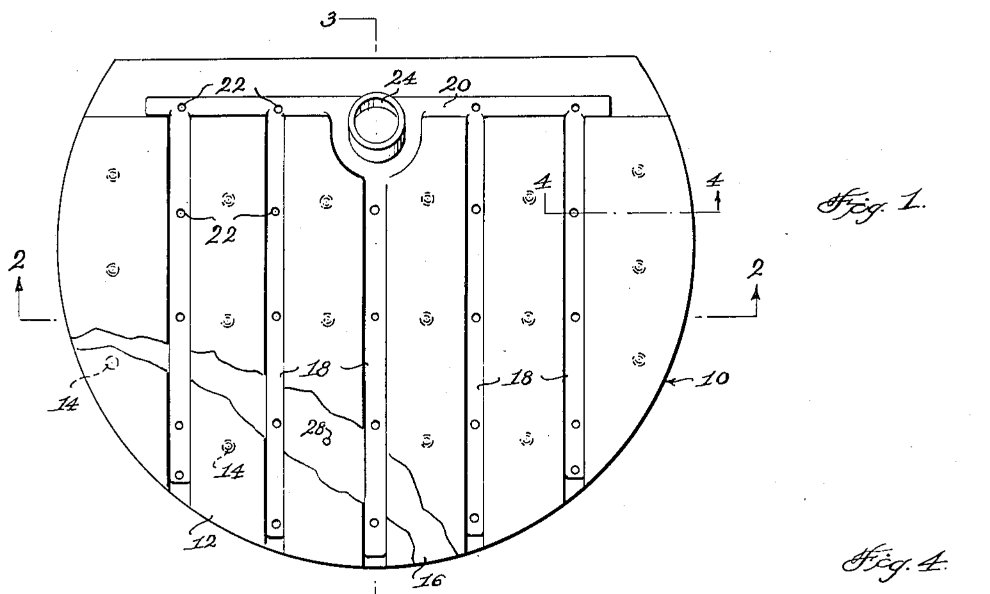
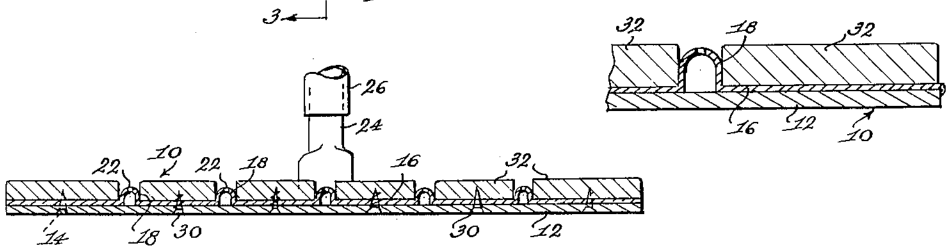
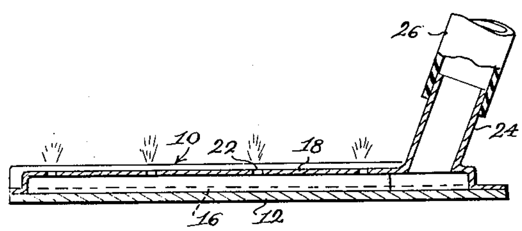
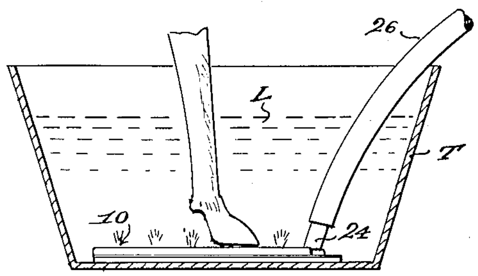
INVENTOR
HARRY B. REID
BY
McMorrow, Berman & Davidson
ATTORNEYS

United States Patent Office 2,719,307

Patented Oct. 4, 1955

1

2,719,307

FOOTREST FOR ANIMAL HYDROTHERAPY

Harry B. Reid, Louisville, Ky.; Rachel Reid, executrix of the estate of said Harry B. Reid, deceased Application July 14, 1953, Serial No. 367,836

2 Claims. (Cl. 4—180)

This invention relates to a foot rest for animal hydrotherapy, and more particularly to a pad adapted to be submerged in a liquid bath upon which the foot or hoof of the animal rests while being treated.

It is well known that animals, particularly race horses because of the breeding for speed, frequently develop ankle, knee and foot ailments in which hydrotherapy, including massage, has proved most beneficial.

The primary object of this invention is to effectively massage the foot and leg of an animal while subjecting the part being treated to a bath which may or may not contain medication.

Another object is to produce the massaging effect by introducing air into the liquid and allowing the bubbles formed thereby to contact the surface to be treated as they rise to the surface of the liquid.

The above and other objects may be attained by employing this invention which embodies among its features a bottom plate, a top plate secured adjacent its perimeter to the bottom plate adjacent the perimeter thereof, said top plate having upwardly extending hollow perforated ribs formed therein and defining with the bottom plate air passages, means carried by the top plate and communicating with the air passages for introducing air thereinto, and relatively thick pads resting on the top plate between the ribs and defining a foot rest for an animal.

Other features include a nipple carried by the top plate and communicating with the air passages for introducing air thereinto and forcing it upwardly through openings in the air passages into the liquid bath.

In the drawings:

Figure 1 is a top plan view of a foot rest embodying the features of this invention;

Figure 2 is a transverse sectional view taken substantially on the line 2—2 of Figure 1;

Figure 3 is a sectional view taken substantially on the line 3—3 of Figure 1;

Figure 4 is a fragmentary enlarged sectional view taken substantially on the line 4—4 of Figure 1; and Figure 5 is a view illustrating the foot plate in a liquid bath in which a foot and ankle of an animal is being treated.

Referring to the drawings in detail, this improved foot rest designated generally 10 comprises a bottom plate 12 having formed therein rows of countersunk perforations 14, the countersunk ends of which open downwardly through the under side of the bottom plate. As shown, the bottom plate is generally circular in plan with one edge extending along a chord of the circle defined by the major portion of the bottom plate.

Welded or otherwise secured to the bottom plate 12 adjacent the perimeter thereof is a top plate 16, portions

2 of which are struck upwardly therefrom to define spaced parallel hollow ribs 18 which communicate adjacent the flat edge of the bottom plate 12 with a transversely extending hollow rib 20. The ribs 18 define with the bottom plate 12 spaced parallel passages which communicate with a passage defined by the rib 20 and the bottom plate 12, and formed in the ribs 18 and 20 and opening upwardly through the top edges thereof are longitudinally spaced openings 22 which form air passages through which air is discharged from the passages defined between the ribs 18 and 20 and the bottom plate 12. A nipple 24 is carried by the top plate adjacent the rib 20 and extends upwardly from said top plate for coupling to a suitable source of air pressure 26 which may take the form of a flexible tube.

The top plate 16 is provided between the ribs 18 with rows of spaced openings 28 which align with the openings 14 in the bottom plate 12 to receive fasteners 30 by means of which cleats 32 are secured in place on the top plates to form cushions upon which the foot of the animal rests in spaced relation to the tops of the ribs 18.

In use, the foot rest is placed in the bottom of a tub T and air is introduced into the nipple 24 through the hose 26. The air passing through the passages defined by the bottom plate 12 and the ribs 18 and 20 will bubble up through liquid L contained in the tub T to massage the foot and ankle of an animal, the foot of which rests on the foot rest 10. Obviously, by increasing the depth of the tub and the liquid contained therein, the length of leg massaged may be increased.

While in the foregoing there has been shown and described the preferred embodiment of this invention, it is to be understood that minor changes in the details of construction, combination and arrangement of parts may be resorted to without departing from the spirit and scope of the invention as claimed.

What is claimed is:

1. A foot rest for animal hydrotherapy comprising a bottom plate, a top plate secured adjacent its perimeter to the bottom plate adjacent the perimeter thereof, said top plate having upwardly extending hollow perforated ribs formed therein and defining with the bottom plate air passages, means carried by the top plate and communicating with the air passages for introducing air thereinto, and relatively thick pads resting on the top plate between the ribs and defining a foot rest for an animal.

2. A foot rest for animal hydrotherapy comprising a bottom plate, a top plate secured adjacent its perimeter to the bottom plate adjacent the perimeter thereof, upwardly extending hollow perforated ribs carried by the top plate and defining with the bottom plate spaced parallel air passages which open into a common perforated header, relatively thick pads of cushioning material carried by the top plate between adjacent ribs to form a foot rest for an animal, fasteners extending through the bottom and top plates for securing the pads in place, and a nipple carried by the top plate and opening into the header for supplying air to the air passages.

References Cited in the file of this patent

UNITED STATES PATENTS

| | | |
|---|---|---|
| 1,699,198 | Millmather | Jan. 15, 1929 |
| 1,775,942 | Millmather | Sept. 16, 1930 |
| 2,649,861 | Melsheimer | Aug. 25, 1953 |